United States Patent [19]

Sandberg et al.

[11] 4,231,993

[45] Nov. 4, 1980

[54] RECOVERY OF METAL VALUES FROM LEAD SMELTER MATTE

[75] Inventors: Richard G. Sandberg; Terry L. Hebble, both of Rolla, Mo.

[73] Assignee: The United States of America as represented by the Secretary of the Interior, Washington, D.C.

[21] Appl. No.: 47,541

[22] Filed: Jun. 11, 1979

[51] Int. Cl.$^3$ .............. C01G 3/12; C01G 21/20; C01G 45/02; C01G 53/11
[52] U.S. Cl. .................... 423/34; 423/37; 423/41; 423/50; 423/87; 423/140; 423/150; 423/605; 423/559; 423/95; 423/98; 423/561 R
[58] Field of Search .............. 423/37, 41, 34, 50, 423/140, 150, 95, 98

[56] References Cited

U.S. PATENT DOCUMENTS

| | | | |
|---|---|---|---|
| 936,762 | 10/1909 | Crispo | 423/41 |
| 1,188,705 | 6/1916 | Vadner | 423/50 |
| 2,343,293 | 3/1944 | Hannay et al. | 423/50 |
| 2,495,456 | 1/1950 | Jacobs | 423/50 |
| 3,615,190 | 10/1971 | Corrick | 423/41 |
| 3,825,652 | 7/1974 | Preisler | 423/50 |
| 4,024,218 | 5/1977 | McKay | 423/140 |

*Primary Examiner*—Brian E. Hearn

*Attorney, Agent, or Firm*—William S. Brown; Donald A. Gardiner

[57] ABSTRACT

A multi-step process for recovering metal values from lead smelter matte. The matte is mixed with sulfuric acid and manganese oxide and leaching is effected at atmospheric pressure to form an aqueous solution including dissolved metal sulfates and a residue containing sulfur and lead sulfate. The sulfur is removable by conventional means and the lead sulfate may be returned to the smelter. The pH of the aqueous sulfate solution is adjusted to 3.5 to 4.5 to precipitate ferric iron and arsenic and pH is readjusted to about 3.0 to redissolve coprecipitated copper. After separation from the precipitate, the aqueous solution is mixed with a sulfiding agent, such as sodium sulfide at a pH of not more than 3 to selectively precipitate copper sulfide. After separating the copper sulfide, the aqueous solution is mixed with further sulfiding agent at a pH of 3 to 4.5 to form a cobalt-nickel sulfide precipitate in which the weight ratio of copper-nickel to sulfur is 1.8. After separation of the precipitate, the pH of the solution is adjusted to 3 to 7 to form a manganese sulfate slurry. The slurry is reacted with oxygen at a temperature of 25°–75° C. to form a manganese-containing precipitate. The precipitate is separated from the brine and heated in a furnace to form manganese oxide which is recycled to the leaching step. The brine is also recycled to the leaching step as a source of sulfuric acid.

20 Claims, No Drawings

RECOVERY OF METAL VALUES FROM LEAD SMELTER MATTE

BACKGROUND OF THE INVENTION

This invention relates to methods for the recovery of metal values from lead smelter matte and, in particular, to the recovery of copper, nickel and cobalt therefrom.

At the present time, mattes produced at lead smelters are either being shipped overseas or to U.S. copper smelters for recovery of copper only. No attempt is presently being made, on a commercial scale, to recover the cobalt and nickel in the United States. Several methods have been developed to recover cobalt, nickel, and copper from mattes, other than lead mattes.

Ammoniacal and acid pressure leaching are most commonly used. These methods require pressures greater than atmospheric, requiring expensive high pressure autoclaves. Reaction times as long as ten hours are required to obtain complete reaction. In ammoniacal solutions, the cobalt content must be kept low because of the formation of insoluble cobaltic hexamine sulfate. This makes it necessary to have larger process streams for cobalt dilution.

Copper-nickel converter mattes are being treated by a strong hydrochloric acid leach which selectively dissolves the nickel as the chloride, leaving the copper and other metals in residue. This procedure has the disadvantages that $H_2S$ is formed and chloride solutions are highly corrosive.

It is an object of the present invention to provide a process for the recovery of metal values from lead smelter matte. It is a further object to provide such a process for the recovery of copper, nickel and cobalt values therefrom. It is yet a further object to provide such a process which includes an acid leaching step which can be carried out at atmospheric pressure in relatively inexpensive equipment.

BRIEF SUMMARY OF THE INVENTION

The foregoing and other objects which will be apparent to those of ordinary skill in the art are achieved in accordance with the present invention by providing a process for the recovery of metal values from lead smelter matte containing cobalt, nickel, copper, iron and arsenic, which process includes the following steps:

(a) mixing finely divided lead smelter matte, manganese oxide and sulfuric acid to form an aqueous solution having a pH of not more than 3.5 and containing cobalt, nickel, copper, iron, arsenic and manganese sulfates and an insoluble solids residue containing sulfur and lead sulfate;

(b) separating the insoluble solids residue and the aqueous solution;

(c) adjusting the pH of the separated aqueous sulfate solution from step b to 3.5 to 4.5 to precipitate ferric iron and arsenic and further adjusting the pH of the solution to a pH of about 3.0 to redissolve co-precipitated copper;

(d) separating the precipitated ferric iron and arsenic from the aqueous solution;

(e) mixing the separated aqueous solution from step d with a sulfide precipitating agent at a pH of not more than 3 to selectively precipitate copper sulfide;

(f) separating the copper sulfide from the aqueous solution;

(g) mixing the aqueous solution separated by step f with a sulfiding agent at a pH of 3 to 4.5 to form a copper-nickel sulfide precipitate;

(h) separating the copper-nickel sulfide precipitate from the aqueous solution;

(i) adjusting the pH of the aqueous solution separated by step h to a pH of 3 to 7 to form a slurry containing manganese sulfate;

(j) reacting the slurry containing manganese sulfate with oxygen at a temperature of 25° to 75° C. to form a manganese-containing precipitate selected from the group consisting of manganese hydroxide and manganese carbonate;

(k) separating the manganese-containing precipitate from the aqueous solution;

(l) heating the manganese-containing precipitate of step j to produce manganese oxide;

(m) returning at least a portion of the separated aqueous solution of step k to step a to provide sulfuric acid for mixing with the lead smelter matte and the manganese oxide; and (n) returning at least a portion of the manganese oxide produced by step l to step a to provide manganese oxide for mixing with the sulfuric acid and the lead smelter matte.

DETAILED DESCRIPTION OF PREFERRED EMBODIMENTS

The first step of the process is an acid leaching step which can be conducted at atmospheric pressure. This step involves mixing manganese dioxide, or a manganese oxide ore consisting of Mn (IV) and/or Mn (III), with lead smelter matte, and an acid, preferably sulfuric acid. Elemental sulfur and lead sulfate are formed as a residue and an aqueous solution containing cobalt, nickel, copper, iron, arsenic, and manganese sulfates is produced. A residue consisting of copper sulfide, lead sulfate, and sulfur is formed if the matte-to-manganese dioxide weight ratio is above 1.2. The copper content of the residue increases with an increasing matte/manganese dioxide ratio. The manganese dioxide is necessary for oxidation of the matte. In addition to utilizing sulfuric acid, other acids, such as the hydrogen halides, can be utilized. The overall reaction of matte (MS), manganese dioxide ($MnO_2$) and sulfuric acid ($H_2SO_4$) is given in the following chemical equation:

$$MnO_2 + MS^* + 2H_2SO_4 \rightarrow MnSO_4 + MSO_4 + 2H_2O + S°$$

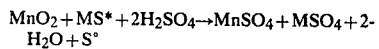
*(MS=Co, Ni, Cu, Pb, As, and Fe sulfide)

The acid leach step is carried out at a temperature of at least 70° C., preferably at least 95° C., as close as possible to the boiling point of the liquid in the slurry. The manganese oxides which can be utilized are the Mn (III) and Mn (IV) oxides. They are used in combination or individually. Where ore is used, it is preferred to utilize ore that is high in manganese dioxide because of its greater oxidizing power. The mattes and manganese dioxide should be finely ground or pulverized. A particle size less than about 10 mesh (U.S. sieve size) is essential, but a particle size less than 100 mesh is preferred.

The matte and manganese dioxide are slurried with an aqueous sulfuric acid solution. In order to obtain good reaction, the matte/manganese dioxide weight ratio is maintained from 1.0 and 2.78, the matte/sulfuric acid weight ratio is maintained from 0.31 to 1.25 and the retention time is one to four hours.

Following completion of the reaction, the insoluble solids are separated from the aqueous leach solution. The latter preferably has a pH of not greater than about 3.5 in order to maintain all of the desired sulfates in solution; optimally, a leach solution having a pH of not more than about 2 is obtained. The separation of the leach solution from the matte solids can be effected by thickening, filtration, etc. The elemental sulfur can also be removed by any appropriate method, such as flotation, or by extraction in an organic solvent. There should be an adequate volume of water present in the leaching solution to dissolve substantially all of the metal sulfates (with the exception of $PbSO_4$). The residue, which includes lead sulfate, can be returned to the lead smelter.

The precipitation of ferric iron and arsenic is next completed by adjusting pH to 3.5 to 4.5 with NaOH and CaO and then decreasing the pH to 3.0 with sulfuric acid to redissolve the coprecipitated copper. The precipitate that forms is a combination of Fe, Ca, and Na arsenates as well as Na and Ca sulfates. The precipitate is removed from the leach solution by filtration or other appropriate procedure.

The filtrate obtained from the iron and arsenic precipitation containing sulfates of copper, nickel, cobalt, and manganese is then sulfide precipitated to remove selectively copper with hydrogen sulfide, sodium sulfide, or ammonium sulfide. The pH is allowed to drift at will from about 3.0 to 0.4. A Cu/S weight ratio from 1.8 to 2.6 is required for good copper precipitation. This precipitation may be monitored using a potentiometric method to determine when precipitation is complete. When precipitation is complete, the copper sulfide precipitate is recovered by filtration or other suitable means. The filtrate from sulfide precipitation containing cobalt, nickel, and the remaining manganese is then sulfided with either $Na_2S$, $(NH_4)_2S$, or $H_2S$. Cobalt and nickel are precipitated at a pH of 3 to 4.5 and a Co-Ni/S weight ratio of 1.8. The sulfide precipitate is recovered by filtration or other suitable means and may be sold as product. Alternatively, cobalt and nickel may be recovered by conventional means.

After precipitation and removal of cobalt and nickel sulfide, manganese is precipitated in a pressure vessel or open container. The pH is adjusted with magnesium oxide (MgO), sodium hydroxide (NaOH), sodium carbonate ($Na_2CO_3$), or other suitable material, to a pH of 3 to 7. The manganese sulfate and MgO, NaOH, or $Na_2CO_3$ slurry is reacted between atmospheric pressure and 150 psi with oxygen which may be supplied as air. The temperature is maintained between 25° and 75° C. A manganese hydroxide or carbonate precipitates in 5 to 25 minutes. The recovered manganese hydroxide or carbonate is heated in a furnace at 200° to 350° C. to form manganese (III) or (IV) oxide. The manganese oxide produced is recycled to the leaching step. The brine remaining after removal of the precipitated manganese hydroxide is returned to leaching. Bleed streams are removed periodically to control the build-up of unwanted metal.

The invention is further illustrated in the Examples which follow:

EXAMPLE 1

A sample of lead smelter matte which contains 23.2 percent nickel, 1.8 percent cobalt, 23.6 percent copper, 30.6 percent lead, 1.2 percent iron, 4.8 percent arsenic, and 7.5 percent sulfur, all by weight, is ground to a particle size of less than 10 mesh. A sample of the ground matte, 87.5 g, dry weight, is mixed with manganese dioxide, 73.5 g, and added to 700 ml of 300 gpl sulfuric acid at a temperature of 70° C. The slurry is stirred by mechanical agitation. The reaction proceeds fairly rapidly, with the temperature increasing to about 100° C. These reaction conditions are maintained for 120 min. Then the mixture is filtered to separate the leach solution from the lead sulfate and sulfur residue. A sample of the leach solution is analyzed and found to contain (in gpl): 27 nickel, 2.3 cobalt, 27 copper, 0 lead, 1.6 iron, 6.5 arsenic, and 63 manganese. The leaching efficiency of the water soluble metals as sulfates in percent is: 98 nickel, 94 cobalt, 94 copper, 0 lead, 96 iron, 94 arsenic, and 99 manganese. The lead sulfate and sulfur-containing residue is removed from the liquor by filtration. This residue is a by-product. The $PbSO_4$ may be recycled to the lead smelter and the sulfur may be removed by standard methods. The precipitation of the ferric iron and arsenic is next completed by adjusting pH to 3.5-4.5 with NaOH and CaO and then decreasing the pH to 3.0 with sulfuric acid to redissolve the coprecipitated copper. The precipitate that forms is a combination of Fe, Ca, and Na arsenates as well as Na and Ca sulfates. The precipitate is removed from the leach solution by filtration. The filtrate obtained from the iron and arsenic precipitation containing sulfates of copper, nickel, cobalt, and manganese is then sulfide precipitated to remove selectively copper with sodium sulfide. The pH is allowed to drift at will from about 3.0 to 0.4 and the Cu/S weight ratio is about 2.2 for good copper precipitation. This precipitation is monitored using a potentiometric method to determine when precipitation is complete. The copper sulfide precipitate is recovered by filtration. The filtrate from sulfide precipitation containing cobalt, nickel, and the remaining manganese is then sulfided with about 11 grams of $H_2S$. Cobalt and nickel are precipitated at a pH of 3 to 4.5 and a Co-Ni/S weight ratio of 1.8. The pH is adjusted with sodium hydroxide for this purpose. The sulfide precipitate is recovered by filtration. The precipitated cobalt and nickel sulfides are easily filtered. The sulfide product containing 2.5 and 37 percent cobalt and nickel, respectively, can be sold for the cobalt and nickel values. The filtrate contains manganese sulfate and miscellaneous sulfate salts. This filtrate is slurried with magnesium oxide to adjust the pH to 6.8. The slurry is pressurized with oxygen in a low-pressure vessel to 70 psi at 25° C. The vessel is stirred with a magnetic stir bar. Dimanganese trioxide precipitates within 10 min. Any residual cobalt or nickel also precipitates. The precipitated residue is recovered by filtration and heated to 250° C. for 3 hours to form manganese dioxide containing small amounts of miscellaneous oxides. This residue, along with the manganese dioxide produced during copper electrolysis, is recycled to leaching.

EXAMPLE 2

A sample of lead smelter matte, having the same composition as Example 1, 50 g, dry weight, is mixed with 20 g manganese dioxide, and added to 400 ml of 150 gpl sulfuric acid at a temperature of 70° C. The slurry is stirred by mechanical agitation. The reaction proceeds at a slower rate than in Example 1 and less heat is generated. Auxiliary heat is supplied to keep the temperature at 90° to 92° C. The reaction conditions are maintained for 150 min. Then the mixture is filtered to separate the leach solution from the lead sulfate, copper sulfide, and sulfur residue. A sample of the leach solution is analyzed and found to contain (gpl): 23 nickel, 2 cobalt, 3.5 copper, 6 arsenic, 1.6 iron, and 30 manganese. The leaching efficiency is 81 percent nickel, 83 percent cobalt, 12 percent copper, 87 percent arsenic, 95 percent iron, and 99 percent manganese. The lead sulfate, copper sulfide, and sulfur-containing residue is removed from the liquor by filtration. This product containing 40 and 50 percent copper and lead, respectively, after sulfur removal, can be sold to a copper smelter or the copper can be recovered by a second leach step similar to the above and the lead sulfate sent to the lead smelter. The filtrate is treated as in Example 1 to remove the iron and arsenic. The copper, cobalt, nickel and manganese are recovered as described in Example 1.

What is claimed is:

1. A method of recovering metal values from lead smelter matte containing cobalt, nickel, copper, iron and arsenic which comprises the steps of:
   (a) mixing finely divided lead smelter matte, maganese (III) or manganese (IV) oxide and sulfuric acid to form an aqueous solution having a pH of not more than 3.5 and containing cobalt, nickel, copper, iron, arsenic and manganese sulfates and an insoluble solids residue containing sulfur and lead sulfate;
   (b) separating the insoluble solids residue and the aqueous solution;
   (c) adjusting the pH of the separated aqueous sulfate solution from step (b) to 3.5 to 4.5 to precipitate ferric iron and arsenic and further adjusting the pH of the solution to a pH of about 3.0 to redissolve coprecipitated copper;
   (d) separating the precipitated ferric iron and arsenic from the aqueous solution;
   (e) mixing the separated aqueous solution from step (d) with a sulfide precipitating agent at a pH of not more than 3 to selectively precipitate copper sulfide;
   (f) separating the copper sulfide from the aqueous solution;
   (g) mixing the aqueous solution separated by step (f) with a sulfiding agent at a pH of 3 to 4.5 to form a cobalt-nickel sulfide precipitate;
   (h) separating the cobalt-nickel sulfide precipitate from the aqueous solution;
   (i) adjusting the pH of the aqueous solution separated by step (h) to a pH of 3 to 7 by means of MgO, NaOH or $Na_2CO_3$ to form a slurry containing manganese sulfate;
   (j) reacting the slurry containing manganese sulfate with oxygen at a temperature of 25° to 75° C. to form a manganese-containing precipitate selected from the group consisting of manganese hydroxide and manganese carbonate;
   (k) separating the manganese-containing precipitate from the aqueous solution;
   (l) heating the manganese-containing precipitate of step (j) to produce manganese oxide;
   (m) returning at least a portion of the separated aqueous solution of step (k) to step (a) to provide sulfuric acid for mixing with said lead smelter matte and said manganese oxide; and
   (n) returning at least a portion of the manganese oxide produced by step (l) to step (a) to provide manganese oxide for mixing with said sulfuric acid and said lead smelter matte.

2. A method according to claim 1 wherein said manganese oxide comprises manganese dioxide.

3. A method according to claim 2 wherein the weight ratio to lead smelter matte to manganese dioxide is above 1.2.

4. A method according to claim 1 wherein the aqueous mixture of step (a) is maintained at atmospheric pressure at a temperature of at least 70° C. for one to four hours.

5. A method according to claim 4 wherein said temperature of the aqueous mixture is at least 95° C.

6. A method according to claim 1 wherein step a) is effected at atmospheric pressure.

7. A method according to claim 1 wherein the matte has a particle size of less than 10 mesh.

8. A method according to claim 7 wherein said mesh size is less than 100 mesh.

9. A method according to claim 2 wherein the weight ratio of matte to manganese dioxide is from 1.0 to 2.78 and wherein the weight ratio of matte to sulfuric acid is from 0.31 to 1.25.

10. A method according to claim 1 wherein the aqueous solution of step (a) has a pH of not more than about 2.

11. A method according to claim 1 wherein, in step (e) the pH is adjusted to 3.5 to 4.5 by adding sodium hydroxide and calcium oxide to the aqueous solution whereby the precipitate that forms comprises a combination of iron, calcium and sodium arsenates and sodium and calcium sulfates.

12. A method according to claim 1 wherein the sulfide precipitation agent of step (e) is selected from the group consisting of hydrogen sulfide, sodium sulfide and ammonium sulfide.

13. A method according to claim 12 wherein, in step (e) the weight ratio of copper to sulfur is from 1.8 to 2.6.

14. A method according to claim 1 wherein, in step (g), the cobalt-nickel sulfiding agent is selected from the group consisting of hydrogen sulfide, sodium sulfide, and ammonium sulfide.

15. A method according to claim 14 wherein, in step (g), the weight ratio of cobalt-nickel to sulfur in said precipitate is about 1.8.

16. A method according to claim 1 wherein step (j) is effected at atmospheric pressure.

17. A method according to claim 1 wherein step (j) is effected at superatmospheric pressure.

18. A method according to claim 17 wherein, in step (j), the precipitating agent is selected from the group consisting of magnesium oxide, sodium hydroxide, and sodium carbonate.

19. A method according to claim 18 wherein, in step (j), the reaction is effected for 5 to 25 minutes.

20. A method according to claim 1 wherein, in step (l), the manganese-containing precipitate is heated in a furnace at a temperature of from 200° to 350° C.

* * * * *